(12) United States Patent
Gopal

(10) Patent No.: US 8,447,796 B2
(45) Date of Patent: May 21, 2013

(54) APPARATUS WITH A VECTOR GENERATION UNIT AND ENCODER FOR RECEIVING FIRST AND SECOND INPUTS TO GENERATE AT LEAST SIGNIFICANT ZERO (LSZ)

(75) Inventor: Vinodh Gopal, Westboro, MA (US)

(73) Assignee: Intel Corporation, Santa Clara, CA (US)

( * ) Notice: Subject to any disclaimer, the term of this patent is extended or adjusted under 35 U.S.C. 154(b) by 1183 days.

(21) Appl. No.: 12/313,841

(22) Filed: Nov. 25, 2008

(65) Prior Publication Data

US 2010/0128812 A1 May 27, 2010

(51) Int. Cl.
*H04L 27/00* (2006.01)

(52) U.S. Cl.
USPC ............ 708/211; 708/208; 708/209; 708/210

(58) Field of Classification Search
USPC .................................................. 708/208–211
See application file for complete search history.

(56) References Cited

U.S. PATENT DOCUMENTS

| | | | | |
|---|---|---|---|---|
| 4,748,575 A | * | 5/1988 | Ashkin et al. | 708/211 |
| 5,040,138 A | * | 8/1991 | Maher, III | 708/497 |
| 2008/0229116 A1 | | 9/2008 | Dixon et al. | 713/190 |

OTHER PUBLICATIONS

E. Hokenek, et al., "Leading-zero anticipator (LZA) in the IBM RISC System/6000 floating-point execution unit," Jan. 1990, pp. 71-77.
Alfred J. Menezes, et al., "Handbook of Applied Crytography," 1997, Section 14.4.1, Binary gcd algorithm. See Google Books: http://books.google.com/books?id=nSzoG72E93MC
&dq=applied+cryptography,+menezes&source=gbs_summary_s
&cad=0.

* cited by examiner

*Primary Examiner* — Tammara Peyton
(74) *Attorney, Agent, or Firm* — Troper, Pruner & Hu, P.C.

(57) ABSTRACT

In one embodiment, the present invention includes a method for receiving a first and second inputs, calculating a sum/difference of the first and second inputs in parallel with determining a least significant zero (LSZ) vector using the first and second inputs, and determining a shift value based on the LSZ vector, where the shift value is used to perform a shift operation on the sum/difference. Other embodiments are described and claimed.

9 Claims, 5 Drawing Sheets

APPARATUS WITH A VECTOR GENERATION UNIT AND ENCODER FOR RECEIVING FIRST AND SECOND INPUTS TO GENERATE AT LEAST SIGNIFICANT ZERO (LSZ)

BACKGROUND

To improve security of computer systems and transactions that occur using them, many different types of encryption can be performed. Such encryption techniques are thus used to protect digital content. One such encryption technique is public key cryptography. In public key encryption (PKE), a message encrypted with a user's public key cannot be decrypted except by the user, who has a corresponding private key. In many algorithms, including PKE algorithms, a greatest common divisor (GCD) of two positive integers needs to be computed. The GCD of 2 numbers is the largest number that evenly divides both.

There are different algorithms to compute the GCD and some require division, which is computationally expensive. A binary GCD algorithm requires a few more operations, but is division-free and instead uses shift operations and therefore is more efficient to implement on most processors. However, current algorithms are complex and still require significant computation time to perform.

DETAILED DESCRIPTION

In various embodiments, a hardware unit may be used to accelerate various algorithms such as a GCD algorithm. In some embodiments, the unit may be part of a PKE engine of a processor.

Table 1 is an example binary GCD algorithm.

TABLE 1

INPUT: 2 positive integers x, y with x >= y
OUTPUT: gcd(x,y)
  1. g ← 1
  2. While both x and y are even do: x ← x/2, y ← y/2, g ← 2g
  3. While x != 0 do:
      a. While x is even do x ← x/2
      b. While y is even do y ← y/2
      c. t ← ABS(x−y)/2
      d. If x = y, then x ← t; else y ← t
  4. Return(g,y)

As shown in Table 1, the most time-consuming part in the algorithm of Table 1 is step 3. As seen, the basic operation in that loop is a divide by 2, which can be done via a single right-shift operation. Operation 3c is different and implements an absolute value of the magnitude of the difference of x and y followed by a right-shift. The resulting GCD is the product of g and y. To ensure that this critical loop is executed as fast as possible, the processor must be able to perform shift operations efficiently (steps 3a, 3b), as well as efficiently perform step 3c. Embodiments may be used to perform the combined subtract and shift operation together at nearly double the speed of a conventional processor.

In other algorithms such as a binary extended GCD algorithm (to compute modular inverses), one also needs efficient computation of:

$$A \leftarrow (A+y)/2 \qquad [EQ.\ 1]$$

$$u \leftarrow u-v,\ \text{if u is even } u \leftarrow u/2 \qquad [EQ.\ 2]$$

The first item (EQ. 1) performs a combined add with right-shift capability; the second item (EQ. 2) performs a subtract with conditional right-shift operation, namely if the result of subtraction is even, the shift is performed. Embodiments may be implemented in hardware to perform these functions optimally with a specialized adder and shifter datapath organization.

More generally, embodiments provide an efficient way of performing the operation $R=(A\pm B) >> x$, where x is the maximal power of 2 that evenly divides the intermediate add/subtract result ($A\pm B$). A fast method to compute the result of an addition/subtraction operation and determine the maximal divisor of the special form $2^k$ to enable shifting the intermediate adder result right by k is thus realized. Note that k is the number of least-significant-zeros (LSZ) in the binary representation of the intermediate result.

Using an embodiment of the present invention, the least-significant zeros in a result of an addition (or subtraction) operation can be computed in parallel with the actual addition. More specifically, this algorithm computes the least-significant-zeros of the result in parallel with the addition operation by processing the inputs of the adder directly in a separate datapath.

Figure 1:
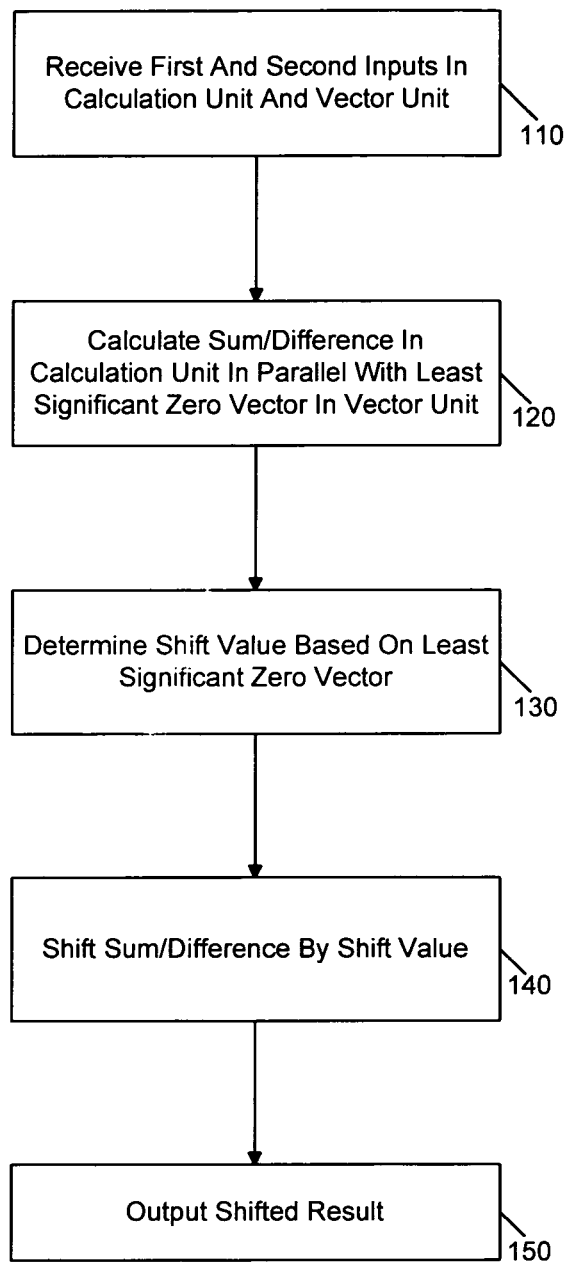
FIG. 1 is a flow diagram of a method in accordance with one embodiment of the present invention.

Referring now to FIG. 1, shown is a flow diagram of a method in accordance with one embodiment of the present invention. As shown in FIG. 1, method 100 may be used to handle parallel operations in a parallel datapath such that a sum and shift operation can be performed efficiently, where a LSZ value is determined in parallel with the addition operation. As shown in FIG. 1, method 100 may begin by receiving first and second inputs in a calculation unit and a vector unit (block 110). For example, an adder/subtractor unit may receive these inputs. In addition, in a parallel datapath, a LSZ generation unit, also referred to herein as a vector unit, may also receive these inputs. Next, the sum/difference of the values may be calculated in the calculation unit in parallel with calculation of a LSZ vector in the vector unit (block 120). As will be described further, below, the sum/difference may be determined based on a control signal to indicate whether an addition or subtraction is to be performed. Of course, additional operations to obtain this result can be performed, such as using complement values, carry inputs and so forth. As further described below, the LSZ vector may be calculated using interim values obtained from the inputs. The LSZ vector can be generated independently in this separate vector unit, or the vector unit can receive the interim values from the calculation unit to determine the LSZ vector, as discussed further below.

Referring still to FIG. 1, a shift value may be determined based on the LSZ vector (block 130). More specifically, in an encoder such as a priority encoder of the parallel datapath, an amount of shift to be performed on the result of the calculation unit can be determined. Next, the resulting value (i.e., sum/difference) may be shifted by the shift value (block 140). For example, a shifter such as a right shift unit may be coupled to receive the result of the calculation unit and perform a shift operation according to the shift value. Finally, this shifted result may be output (block 150), where it may be used for further operations in an algorithm such as a GCD algorithm. While shown with this particular implementation in the embodiment of FIG. 1, the scope of the present invention is not limited in this regard.

In one embodiment, determination of the LSZ may be in accordance with the following. Let A, B be 2 N-bit numbers, which are inputs to the adder. Let c_in be the carry-in bit. Let Res (S) be the N-bit result of the add. Note that there is no need to distinguish between add and subtract because subtract is modeled as an add with the 1s-complement of one input with a carry-in. Next, 3 N-bit vectors, propagate (P), generate (G) and kill (K), respectively, may be defined as:

$$P(N-1,0)=A(N-1,0) \text{ XOR } B(N-1,0) \quad [EQ. 3]$$

$$G(N-1,0)=A(N-1,0) \text{ \& } B(N-1,0) \quad [EQ. 4]$$

$$K(N-1,0)=\sim A(N-1,0) \text{ \& } \sim B(N-1,0) \quad [EQ. 5]$$

The N-bit least-significant-zero vector LSZ may be defined as follows:

$$\text{For}(I=N-1;I\rightarrow 0;I--)\{LSZ[I]=(P[I] \text{ \& } K[I-1])|(\sim P[I] \text{ \& } \sim K[I-1])\} \quad [EQ. 6]$$

// bit-wise XNOR of P,K $$LSZ[0]=(P[0] \text{ \& } \sim c\_in)|(\sim P[0] \text{ \& } c\_in) \quad [EQ. 7]$$

// XOR of P[0] & carry_in

It can be shown that the LSZ vector has the same number of least-significant-zeros as the sum Res. The above computation to get the LSZ vector is very fast, since each bit is computed independently and uses a small exclusive-OR (XOR)-like gate. The P, G, K vectors take 1 gate delay, giving a total time of 2 gate delays to compute the LSZ. This scheme works even if Res is negative. After obtaining the LSZ vector, it can be priority-encoded to obtain the least-significant-zero count, without waiting for Res.

Embodiments may be implemented in various manners including hardware, software, firmware or combinations thereof. In some implementations, a parallel datapath may be provided, e.g., as part of an execution unit of a PKE engine, which may be part of a network processor, general purpose processor or other processing circuit.

Figure 2A:
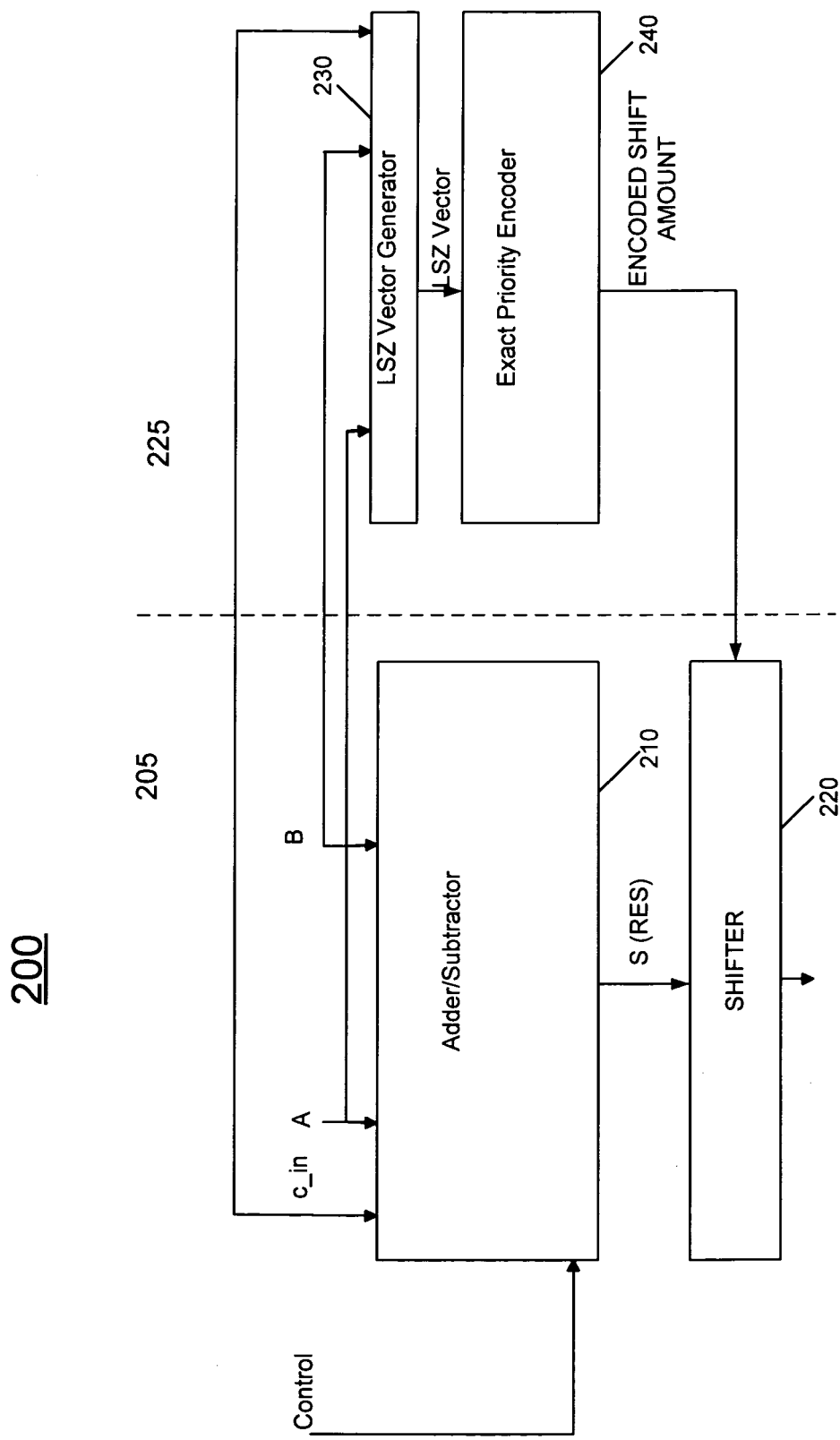
FIG. 2A is a block diagram of a datapath in accordance with one embodiment of the present invention.

Referring now to FIG. 2A, shown is a block diagram of a datapath 200 in accordance with one embodiment of the present invention. As shown in FIG. 2A, datapath 200 may be a parallel datapath having a first path 205 and a second path 225. As shown, first path 205 includes a first calculation unit 210, which may be an adder/subtractor having an output coupled to a shifter 220. In turn, second path 225 includes a vector generation unit 230 such as an LSZ vector generator having an output coupled to a priority encoder 240, which may be an exact priority encoder, as no correction steps are needed. The output of encoder 240 is used to control shifter 220.

As seen in FIG. 2A, both paths are coupled to receive a pair of input values, namely a first input (A) and a second input (B), and a carry input (c_in). Still further, adder/subtractor 210 may also receive control information which may, among other purposes, control adder/subtractor to perform an addition or subtraction operation.

In operation, the two datapaths 205 and 225 may operate independently. Specifically, adder/subtractor 210 may perform the selected combination operation and provide a result (RES) to shifter 220 which, in one embodiment may be a right shifter. From these same inputs, LSZ vector generator 230 may generate an LSZ vector, in accordance with Equations 3-7 above. Based on that LSZ vector, priority encoder 240, which may be an exact priority decoder (i.e., needs no correction steps) generates an encoded shift value which indicates the amount of shift (i.e., the maximal $2^k$ divisor, or zero count of the add/subtract result) to be performed by shifter 220. In one embodiment, the combination operation in adder/subtractor 210 may be performed in a single cycle and the shift operation of shifter 220 performed in a second cycle. In turn, the operations in the parallel datapath 225 may be performed in a single cycle. In this way, at least one cycle can be reduced from the critical path (i.e., datapath 205), as the priority encoder can determine the appropriate shift amount independently of the result of adder/subtractor 210.

Figure 2B:
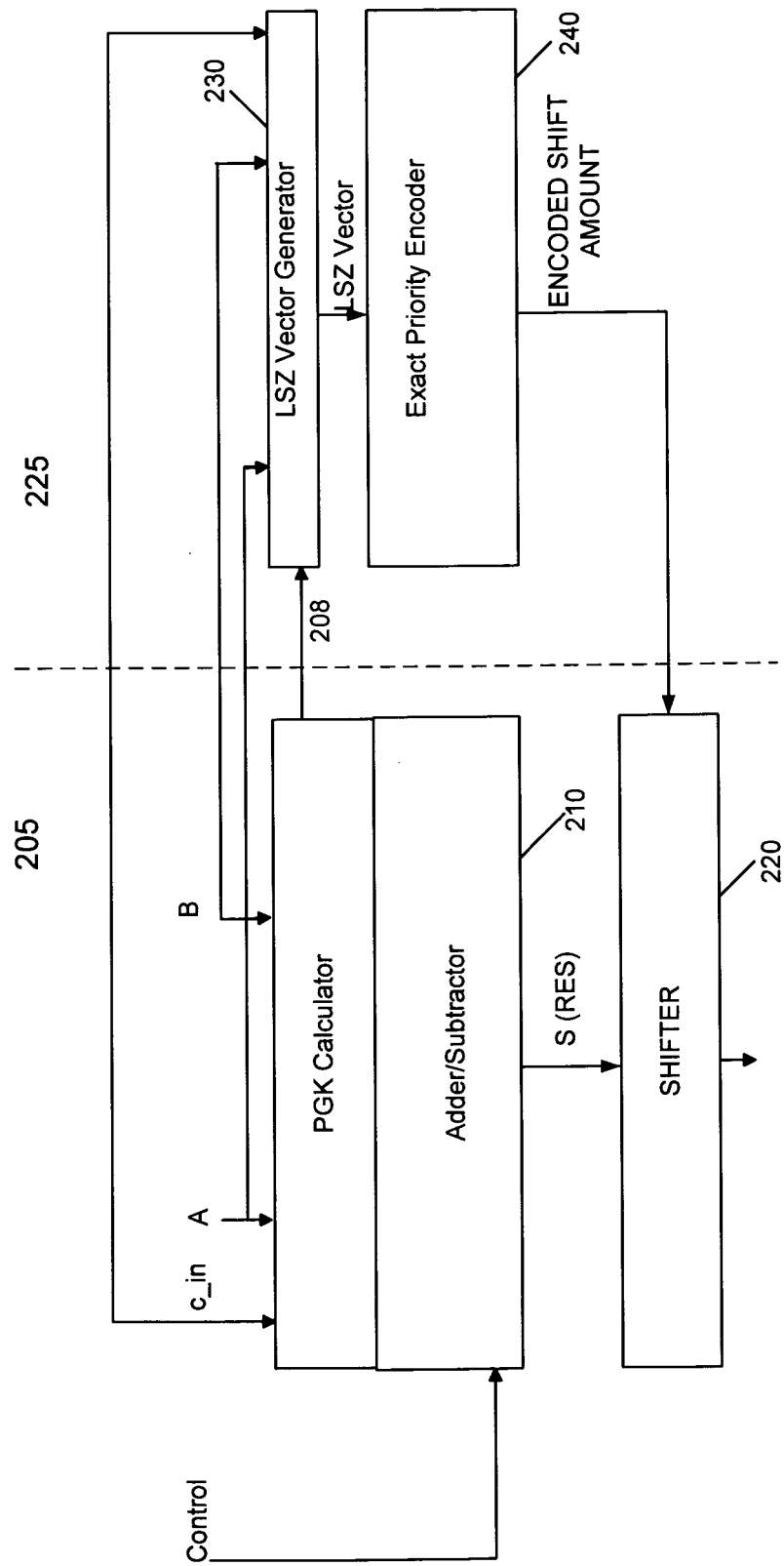
FIG. 2B is a block diagram of a datapath in accordance with another embodiment of the present invention.

In other implementations, at least some of the operations performed by LSZ vector generator 230 can be handled in adder/subtractor 210. Referring now to FIG. 2B, shown is a block diagram of a datapath in accordance with another embodiment of the present invention. As shown in FIG. 2B, datapath 200 may be configured similarly to that of FIG. 2A. However, note the presence of an interconnect 208 between adder/subtractor 210 and LSZ vector generator 230. As more fully shown in FIG. 2B, adder/subtractor 210 may include a PGK calculator, as typical adders may include circuitry to handle these calculations, which can be used for carry and other operations. Accordingly, to reduce implementation size, power consumption and so forth, in the embodiment of FIG. 2B, the PGK values (such as defined above in Equations 3-5) calculated may be provided via interconnect 208 to LSZ vector generator 230, which can then generate the LSZ vector based on these values. In other respects, datapath 200 may be implemented the same as described above with regard to datapath 200 of FIG. 2A.

In various embodiments, the circuit area can be minimal. This is especially so, since the logic for determining the intermediate values {P,G,K} can be shared with the adder, as described above with regard to FIG. 2B. Note that a priority encoder is used regardless of whether the encoding is computed on the LSZ vector or the Result. In fact, since LSZ is computed in parallel with the add operation, the encoder itself can be optimized for area/power. Embodiments thus remove a whole extra cycle of delay in the pipeline, as existing implementations have to compute the priority-encode on the result, rather than on the LSZ vector.

Presented now are several examples in accordance with an embodiment of the present invention. First, let A=14, B=2. Let us represent the numbers as 6-bit 2's complement numbers. The result S=(A+B) is 16. Below each pair of inputs, we show the P,G,K vectors combined into a single value, since they are mutually exclusive. That is, each bit can assert exactly one.

A: 001110
B: 000010 // carryin=0
The resulting combined vector value is: Kkppgk. LSZ(4) is the first position from right that is set, (i.e., k[4] and p[3] matches the second term in the LSZ equation).
LSZ:010000
S: 010000 (Sum=16)

Next, let A=14, B=8. Let us represent the numbers as 6-bit 2's complement numbers. The result S=(A+B) is 22. Below each pair of inputs, we show the P,G,K vectors combined into a single value, since they are mutually exclusive. That is, each bit can assert exactly one.

A: 001110
B: 001000 // carryin=0
The resulting combined vector value is: Kkgppk. LSZ(1) is the first position from right that is set, (i.e., p[1] and k[0] matches the first term in the LSZ equation).
LSZ:011010
S: 010110(Sum=22)

Finally, as an example of a subtraction, let A=1, B=−3. The result S=(A+B) is −2.

A: 000001
B: 111100+1 // carryin=1, B is 1s-complement of 3, effectively giving −3

The resulting combined vector value is: Ppppkp. LSZ(1) is the first position set (i.e., k[1] and p[0] matches the second term in the LSZ equation)

LSZ: 000110
S; 111110 (Difference is −2)

Using an embodiment of the present invention, a binary GCD algorithm such as above in Table 1 can be modified to the following format to leverage the use of the LSZ vector.

TABLE 2

INPUT: 2 positive integers x, y with x >= y
OUTPUT: gcd(x,y)
g ← 1
While both x and y are even do: x ← x/2, y ← y/2, g ← 2g
While x is even do x ← x/2
While y is even do y ← y/2 // Now x, y are both odd
t ← ABS ((x−y)/$2^k$) // instruction of Table 3 below (k is the LSZ of the subtract result)
If x >= y, then x ← t; else y ← t
While x ! = 0 do:
    t←ABS((x−y)/$2^k$) // instruction of Table 3 below (k is the LSZ of the subtract result)
    If x >=y, then x←t; else y←t
Return(g.y)

Thus the critical loop of steps 3 a-c of Table I have been replaced in the more efficient algorithm above. Note that in one embodiment, a user-level instruction may be used to handle the combination/shift operation in parallel using the LSZ value determined in a parallel datapath. Table 3 is an embodiment of such a user-level instruction.

TABLE 3

Dst=add_or_sub_with_arith_right_shift (src1, src2), imm8[7:0]
If imm8[0] op = add else sub
If imm8[1] for sub operation, generate the ABS value
If imm8[2] perform unconditional arithmetic right-shift by 1
If imm8[3] perform conditional arithmetic right-shift by k (where k is the maximal LSZ count)

This instruction can set the zero and negative flags based on the result. Note that the absolute (ABS) value for the subtract operation may be difficult to do in the same hardware and may use back-to-back micro-operations where the first result is followed by a condition operation that performs the 2's complement of the result based on the negative flag being set by the first operation.

Using an embodiment of the present invention, a processor can achieve very fast performance on GCD and modular inverse algorithms, among other such algorithms. This is so, as the multiple instructions required to compute the operations separately and handle the data dependencies in such conventional processors can be slow to execute. Embodiments thus can improve performance by nearly doubling the speed of the slowest step in the critical loop of such algorithms, giving an average gain of 15-25% for GCD.

Figure 3:
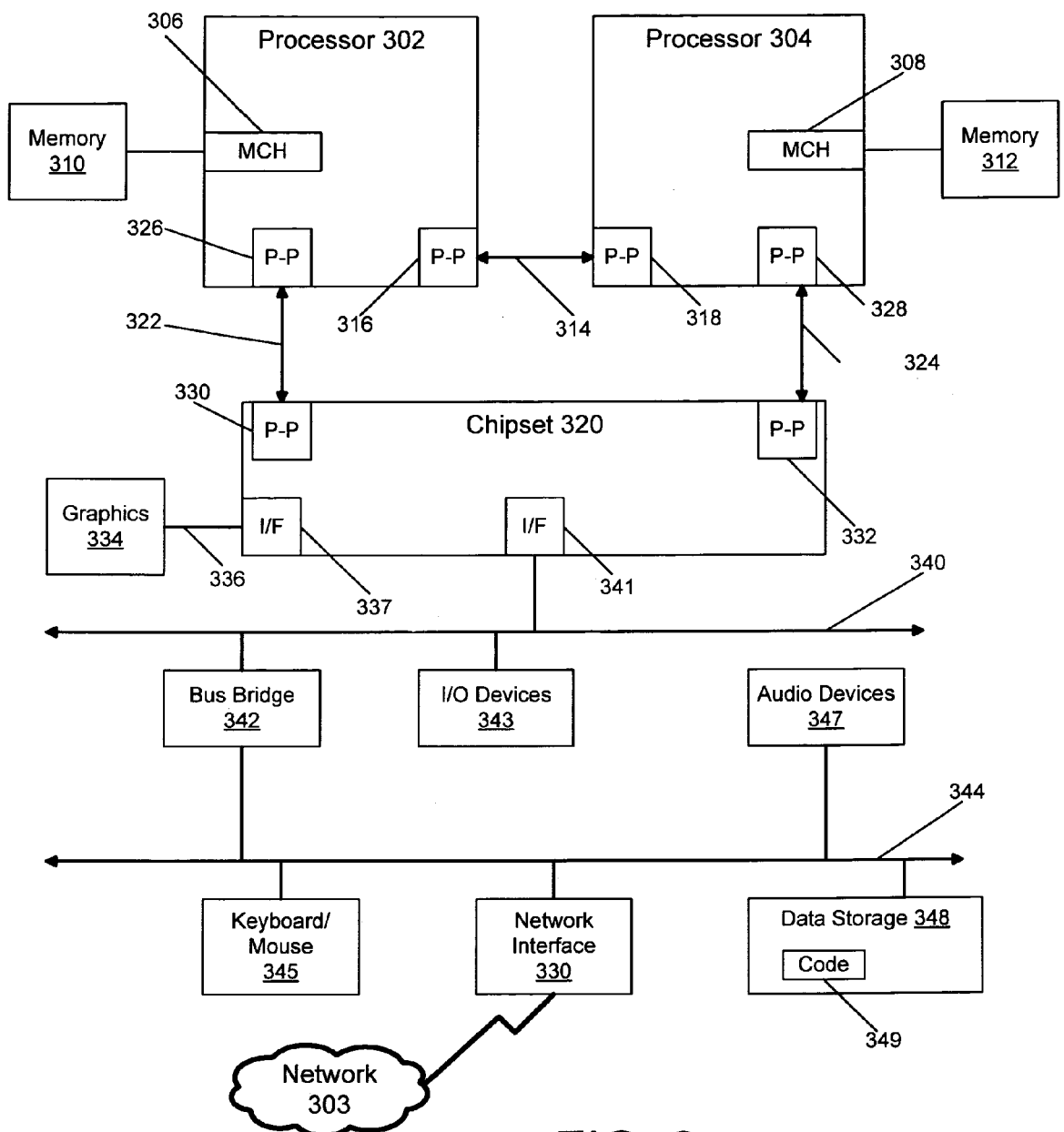
FIG. 3 is a computing system according to an embodiment of the invention.

Referring now to FIG. 3, shown is a computing system 300 that is arranged in a point-to-point (PtP) configuration, according to an embodiment of the invention. In particular, FIG. 3 shows a system where processors, memory, and input/output devices are interconnected by a number of point-to-point interfaces. As illustrated in FIG. 3, the system 300 may include several processors, of which only two, processors 302 and 304 are shown for clarity. The processors 302 and 304 may each include a local memory controller hub (MCH) 306 and 308 to couple with memories 310 and 312. The memories 310 and/or 312 may store various data.

The processors 302 and 304 may be any suitable processor such as a general purpose processor, a network processor (that processes data communicated over a computer network 303), or other types of processors (including a reduced instruction set computer (RISC) processor or a complex instruction set computer (CISC)). Moreover, the processors may have a single or multiple core design. The processors with a multiple core design may integrate different types of processor cores on the same integrated circuit (IC) die. Also, the processors with a multiple core design may be implemented as symmetrical or asymmetrical multiprocessors. The processors 302 and 304 may exchange data via a point-to-point (PtP) interface 314 using PtP interface circuits 316 and 318, respectively. The processors 302 and 304 may each exchange data with a chipset 320 via individual PtP interfaces 322 and 324 using PtP interface circuits 326, 328, 330, and 332. The chipset 320 may also exchange data with a high-performance graphics circuit 334 via a high-performance graphics interface 336, using a PtP interface circuit 337.

In different implementations, embodiments of the invention may be performed using parallel datapaths within an execution unit of processors 302 and 304. For example, the processors 302 and/or 304 may include a parallel datapath such as shown in one of FIGS. 2A and 2B. Alternately, a network processor of the system 300, such as a network interface device 330, may be configured to include such a parallel datapath and to perform embodiments. Other embodiments of the invention, however, may exist in other circuits, logic units, or devices within the system 300 of FIG. 3. Furthermore, other embodiments of the invention may be distributed throughout several circuits, logic units, or devices illustrated in FIG. 3.

The chipset 320 may be coupled to a bus 340 using a PtP interface circuit 341. The bus 340 may have one or more devices coupled to it, such as a bus bridge 342 and input/output (I/O) devices 343. Via a bus 344, the bus bridge 343 may be coupled to other devices such as a keyboard/mouse 345, the network interface device 330 (such as modems, network interface cards (NICs), or the like that may be coupled to computer network 303), audio I/O device 347, and a data storage device 348. The data storage device 348 may store code 349, which may include algorithms that leverage the LSZ vector to efficiently handle combination/shift operations that may be executed by the processors 302 and/or 304.

Figure 4:
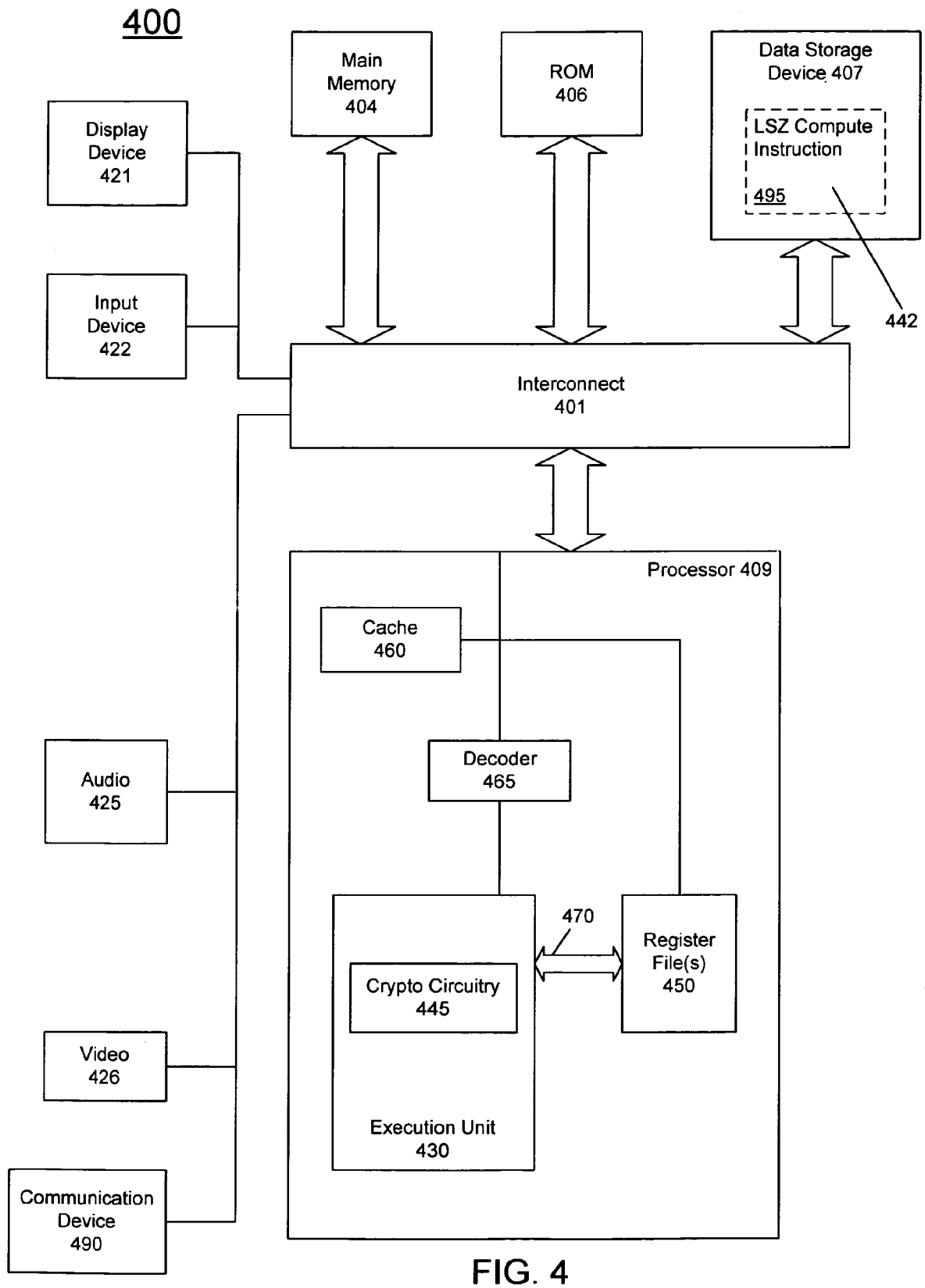
FIG. 4 illustrates an example computer system according to another embodiment of the invention.

FIG. 4 illustrates an example computer system 400 according to another embodiment of the invention. Computer system 400 includes an interconnect 401 for communicating information. The interconnect 401 may include a multi-drop bus, one or more point-to-point interconnects, or any combination of the two, as well as any other communications hardware and/or software.

FIG. 4 illustrates a processor 409, for processing information, coupled with interconnect 401. Processor 409 represents a central processing unit of any type of architecture, including a CISC or RISC type architecture. Computer system 400 further includes a dynamic random access memory (DRAM) or other dynamic storage device (referred to as main memory 404), coupled to interconnect 401 for storing information and instructions to be executed by processor 409. Computer system 400 also includes a read only memory (ROM) 406, and/or other static storage device, coupled to interconnect 401 for storing static information and instructions for processor 409. FIG. 4 additionally shows a data storage device 407 (e.g., a magnetic disk, optical disk, solid state drives (SSDs), and/or other machine readable media) that can be coupled to computer system 400. In addition, the data storage device 407 is shown to include code 495 for execution by the processor 409. The code 495 can include one or more user-level LSZ compute instructions 442, which can be executed to cause the processor 409 to handle arithmetic/shift operations using a LSZ vector as described above.

FIG. 4 also illustrates that processor 409 includes an execution unit 430, a register file 450, a cache 460, a decoder 465, and an internal interconnect 470, among others. Decoder 465 decodes instructions received by processor 409 and execution unit 430 executes instructions received by processor 409. In addition to recognizing instructions typically implemented in general purpose processors, decoder 465 and execution unit 430 may recognize instructions as described above for performing PKE operations that implement use of a LSZ vector.

In response to these control signals and/or microcode entry points, execution unit 430 performs the appropriate operations. For example, for performing a PKE or other algorithm that leverages a LSZ vector, decoder 465 causes execution unit 430 to perform parallel determinations of a sum/difference and LSZ value to obtain a shift amount to apply to the result. For at least some embodiments, execution unit 430 may include crypto circuitry 445 to implement a parallel datapath, such as shown in FIGS. 2A and 2B.

Computer system 400 can also be coupled via interconnect 401 to a display device 421 for displaying information to a computer user. Display device 421 can include a frame buffer, specialized graphics rendering devices, a liquid crystal display (LCD), and/or a flat panel display. An input device 422, including alphanumeric and other keys, may be coupled to interconnect 401 for communicating information and command selections to processor 409.

Additionally, computer system 400 can be coupled to an audio device 425 for sound recording, and/or playback. Computer system 400 may further include video device 426 and/or a communication device 490 (e.g., a serial communications chip, a wireless interface, an Ethernet chip or a modem, which provides communications with an external device or network).

Embodiments may be implemented in code and may be stored on a storage medium having stored thereon instructions which can be used to program a system to perform the instructions. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), solid state drives (SSDs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
a first calculation unit to receive a first input and a second input and to generate a result of a combination of the first and second inputs responsive to a selection signal;
a vector generation unit to receive the first and second inputs and to generate a least significant zero (LSZ) vector based on the first and second inputs;
an encoder to receive the LSZ vector and to generate a shift value therefrom; and a shift unit to receive the result and to shift the result responsive to the shift value.

2. The apparatus of claim 1, wherein the shift value is generated in parallel with generation of the result in the first calculation unit and is generated exactly without post correction.

3. The apparatus of claim 1, wherein the LSZ vector is generated independently of the result.

4. The apparatus of claim 3, further comprising a parallel datapath, wherein a first path includes the first calculation unit and the shift unit, and a second path includes the vector generation unit and the encoder.

5. The apparatus of claim 1, wherein the LSZ vector of LSZ [I, 0] is generated according to: LSZ[I]=(P[I] & K[I−1])|(~P[I] & ~K[I−1])} for (I=N−1;I>0), and LSZ[0] according to: (P[0] & ~c_in)|(~P[0] & c_in), where P(N−1,0)=A(N−1,0) XOR B(N−1,0), G(N−1,0)=A(N−1,0) & B(N−1,0), and K(N−1,0)=~A(N−1,0) & ~B(N−1,0), and where A is the first input, B is the second input, and c_in is a carry input.

6. The apparatus of claim 1, wherein the first calculation unit is to perform an addition or subtraction of the first and second inputs responsive to the selection signal.

7. The apparatus of claim 6, wherein the shifted result is used to determine a greatest common divisor (GCD) of the first and second inputs and the shift value is a maximal divisor $2^k$ of the addition or subtraction, wherein the shift value corresponds to k.

8. The apparatus of claim 1, wherein the first calculation unit is to perform an addition of the first and second inputs if the selection signal has a first value and the first calculation unit is to perform a subtraction of the first and second inputs if the selection signal has a second value unequal to the first value.

9. The apparatus of claim 1, wherein the shift value is generated in parallel with generation of the result in the first calculation unit.

* * * * *